(12) United States Patent
Terwart et al.

(10) Patent No.: US 11,796,017 B2
(45) Date of Patent: Oct. 24, 2023

(54) METHOD FOR OPERATING A HYDRAULIC ACTUATOR

(71) Applicant: ZF Friedrichshafen AG, Friedrichshafen (DE)

(72) Inventors: Markus Terwart, Thundorf (DE); Lukas Spath, Schonungen (DE); Andreas Fischer, Eriskirch (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 0 days.

(21) Appl. No.: 17/873,801

(22) Filed: Jul. 26, 2022

(65) Prior Publication Data

US 2023/0037821 A1    Feb. 9, 2023

(30) Foreign Application Priority Data

Jul. 27, 2021    (DE) .................... 10 2021 208 062.6

(51) Int. Cl.
*F16D 43/28*    (2006.01)
*F16D 48/02*    (2006.01)

(52) U.S. Cl.
CPC ............. *F16D 43/28* (2013.01); *F16D 25/14* (2013.01)

(58) Field of Classification Search
CPC ........ F16D 43/28; F16D 25/14; F16D 48/066; F16D 2500/1026
See application file for complete search history.

(56) References Cited

U.S. PATENT DOCUMENTS 6,101,438 A    8/2000    Staiger et al.
8,855,879 B2    10/2014    Bader et al.
9,746,074 B2 *    8/2017    Kitazawa ........ B60W 30/18027

FOREIGN PATENT DOCUMENTS

DE    19955987 A1    7/2001
DE    102009055063 A1    6/2011
WO    WO 97/21943 A1    6/1997

OTHER PUBLICATIONS

German Search Report DE 10 2021 208 062.6, dated Apr. 4, 2022. (12 pages).

* cited by examiner

*Primary Examiner* — Huan Le
(74) *Attorney, Agent, or Firm* — Dority & Manning, P.A.

(57) ABSTRACT

A method for operating a hydraulic actuator for a prime mover or a drive device of a vehicle includes determining that the hydraulic actuator is to be actuated via an actuating system and detecting an operating variable influenced by a filling state of the hydraulic actuator indicative of pressure conditions in the hydraulic actuator, with the operating variable being separate from actuator operating variables of the hydraulic actuator and the actuating system. The method further includes pressurizing the actuator during a fast fill phase to one or more pressures over a fast fill time period in response to determining that the hydraulic actuator is to be actuated. The fast fill time period and the one or more pressures are adjusted as a function of the operating variable under certain operating conditions. Additionally, the method includes pressurizing the actuator during a pressure build-up phase after the fast fill phase.

24 Claims, 8 Drawing Sheets

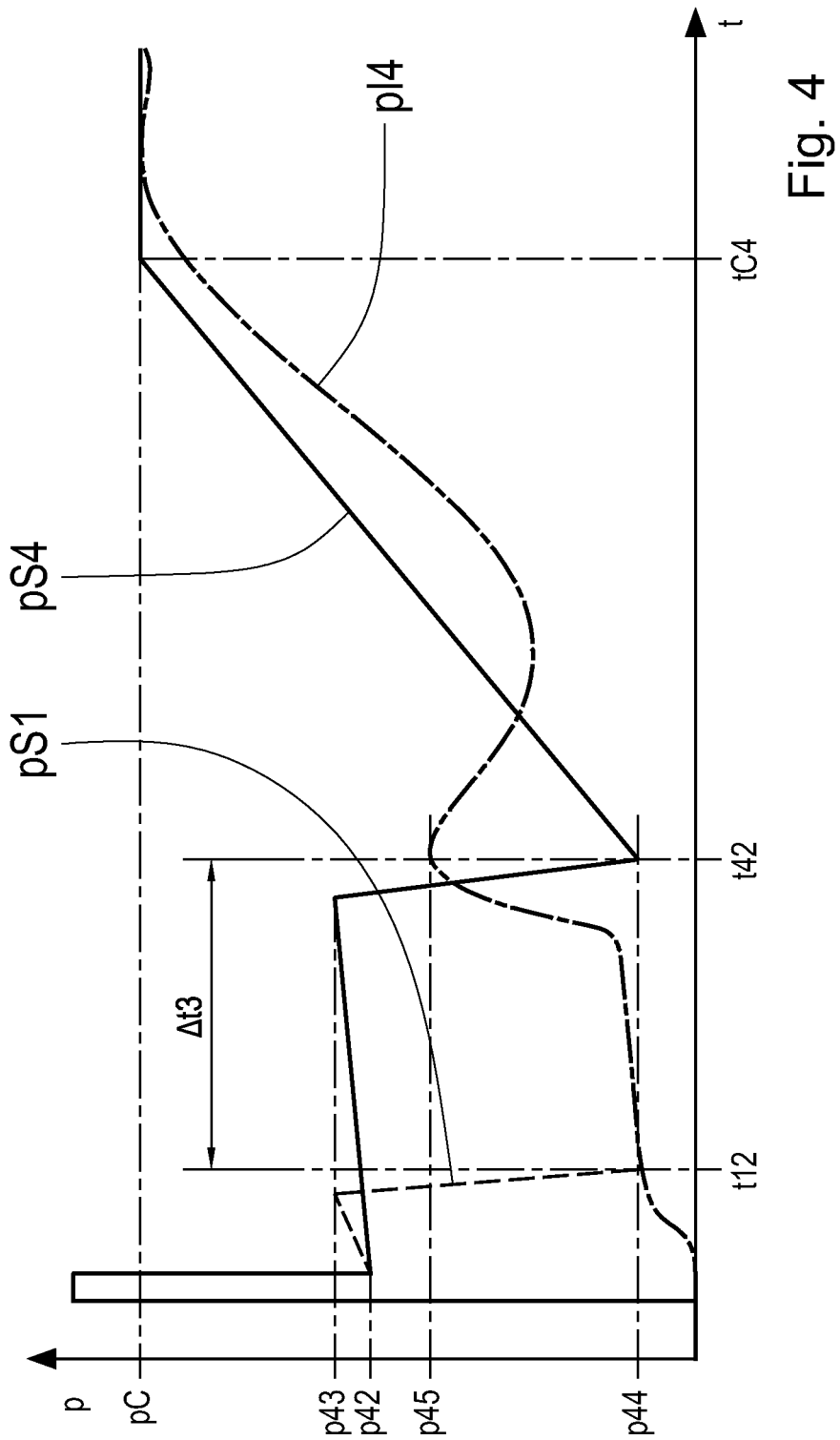

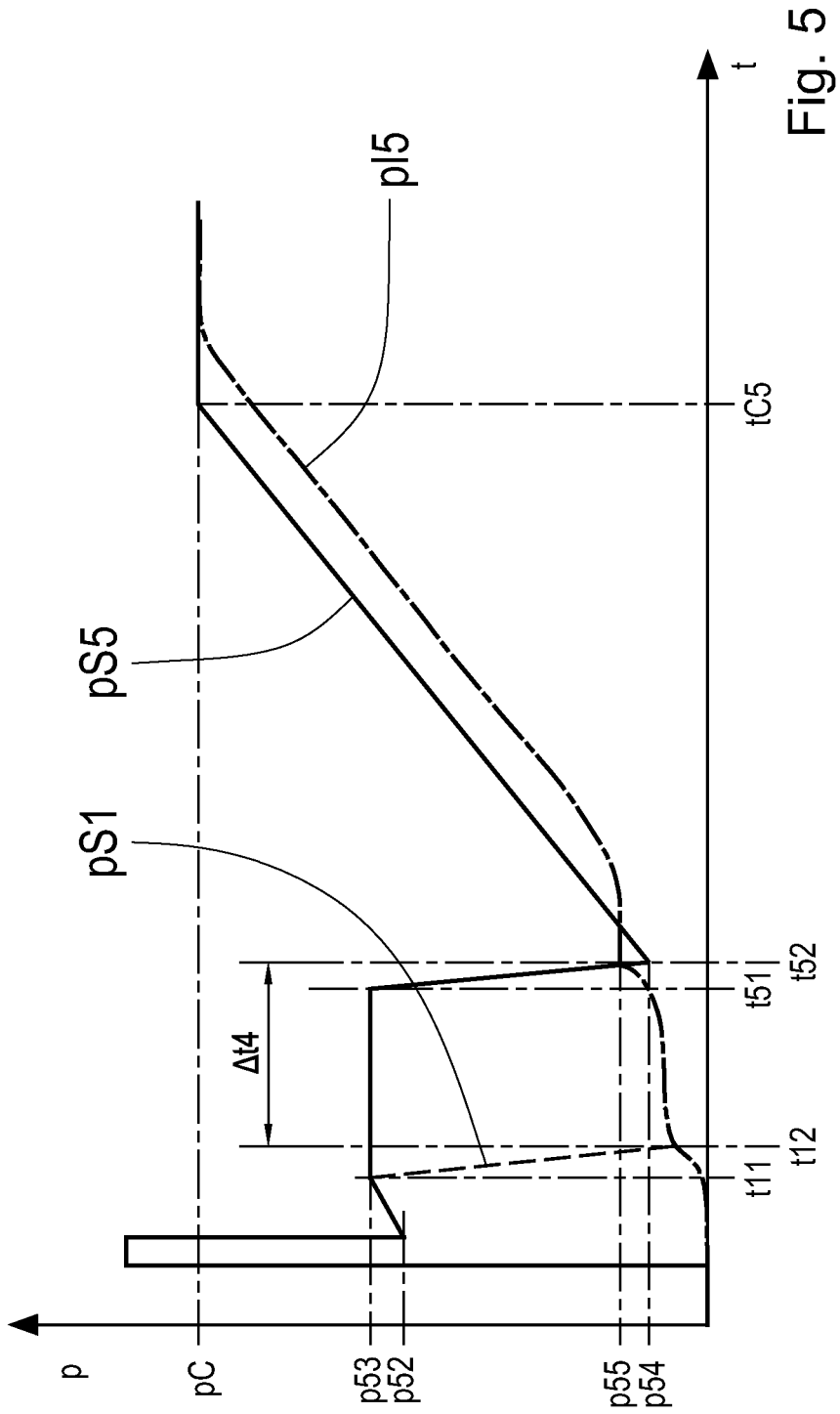

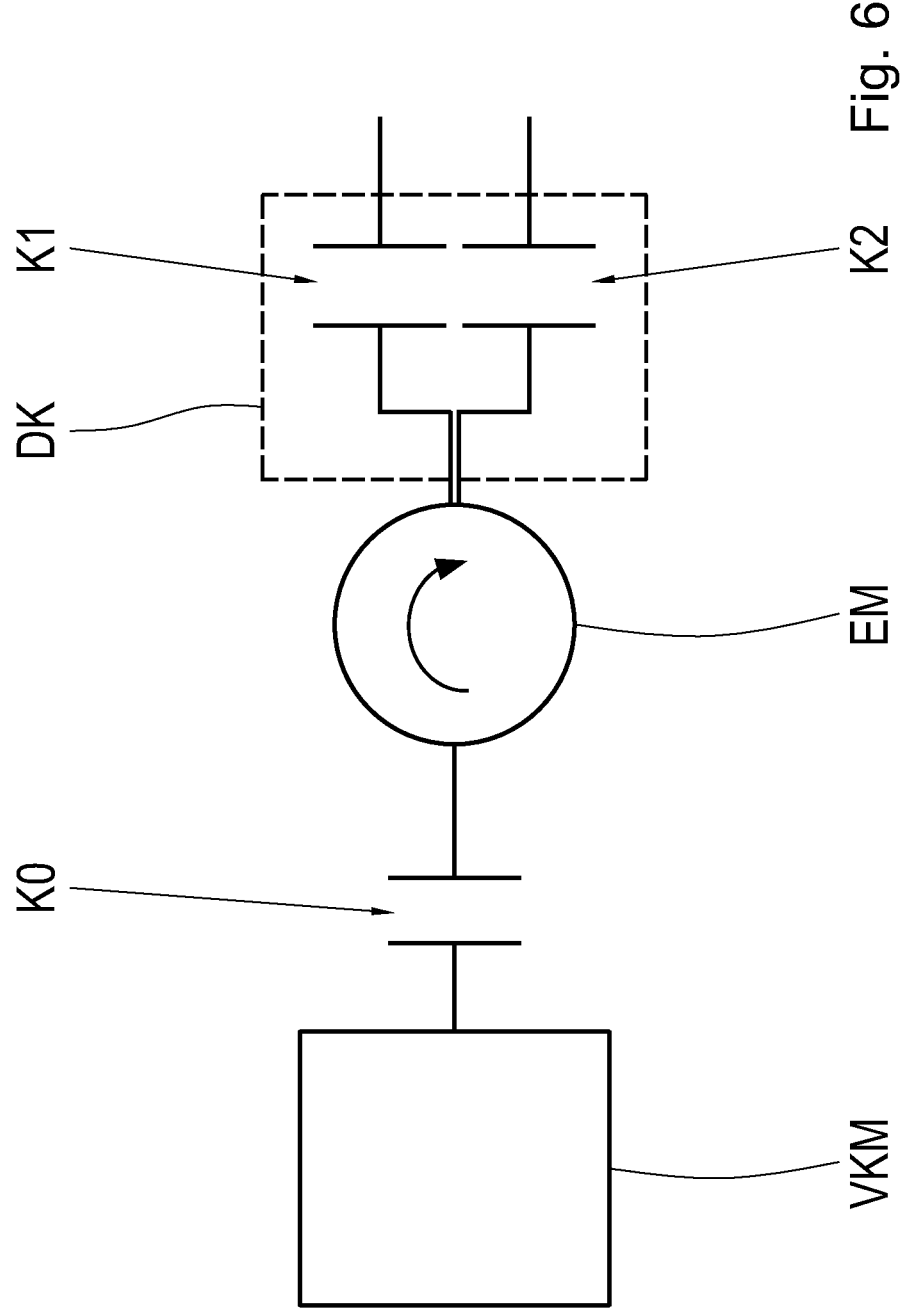

METHOD FOR OPERATING A HYDRAULIC ACTUATOR

CROSS-REFERENCE TO RELATED APPLICATION

The present application is related and has right of priority to German Patent Application No. 10 2021 208 062.6 filed on Jul. 27, 2021, the entirety of which is incorporated by reference for all purposes.

FIELD OF THE INVENTION

The invention relates generally to a method for operating a hydraulic actuator for a vehicle, in particular for a motor vehicle having a drive device, and to a drive device and a vehicle having such hydraulic actuator.

BACKGROUND

Hydraulic actuators are utilized, for example, in automatic transmissions for motor vehicles. A mechanical effect is achieved when the hydraulic actuators are acted upon by hydraulic energy. In the case of hydraulic shift elements, this effect is a coupling of rotating transmission parts by a clutch or a mechanical actuating motion such as with respect to the shifting rails of a dual-clutch transmission. For example, during a ratio change in an automatic transmission, usually at least one shift element is disengaged and another shift element is engaged. The shift elements are friction-locking and/or form-locking. A friction-locking shift element is usually a lamellar shift element. A distinction is made between multi-disk clutches, by which two rotating transmission elements are connectable, and multi-disk brakes, by which a rotating transmission element is connectable to the transmission housing and, thereby, is brought to a standstill.

During the actuation of a hydraulic actuator, the hydraulic actuator must be filled with an operating medium, usually hydraulic or transmission oil, and pressurized. The pressurization is carried out in a fast fill phase and a pressure build-up phase. If the hydraulic actuator is, for example, a friction-locking shift element such as a multi-disk clutch, then, in the pressure build-up phase, the mutually frictional shift element halves are pressed against one another, under a hydraulic pressure, to an increasingly greater extent until a rotationally fixed coupling exists between the shift element halves. In the case of hydraulic actuators for shifting rails, which are, for example, cylinder-piston units, the hydraulically generated movement results in the displacement of the associated gear shift sleeves and, in this way, a gear is engaged or disengaged in a form-locking manner. The fast fill phase is necessary here in order to be able to begin with the pressure build-up phase as promptly as possible after a shift command from an electronic control unit. During this fast fill phase, play, such as, for example, the air gap and elasticities of the shift element, is compensated for in the shortest amount of time possible. An air gap is to be understood in the following as the distance that a hydraulic piston acting upon the shift element must cover until the play between the disks is reduced so far that the disks rest against each other without being able to transmit a torque sufficient for driving the vehicle, however. In order to overcome the air gap of a hydraulically actuated clutch largely as quickly as possible, clutches from the prior art are filled via fast filling, which extends temporally over a fast fill phase up to the clutch engagement point, as is known, for example, from DE 199 55 987 A1. From that point forward, the torque transmission begins.

The temporal length of the fast fill phase, which is also referred to as the fast fill time, is based on a bleed actuating system and adapted to the particular actuating system. An actuating system is understood in the following to be the part of the hydraulic system in which a hydraulic pressure—which is directly or indirectly active upon the hydraulic actuator—at least approximately prevails and is adjustable. An indirect effect is to be understood, for example, to be a pressure effect via an intensifier piston or a valve spool of a control valve. The pressure in the actuating system is adjustable, for example, by an electronic pressure actuator.

Unfortunately, it is unavoidable, primarily after a longer non-actuated state, that the hydraulic system at least partially drains, and so air collects in the actuating system. As a result, hydraulic control units and the hydraulic actuators to be activated, such as, for example, the clutches or cylinders for actuating the shifting rails, have very considerably increased dynamic delays in the response characteristic such that the actual pressure profile acting upon the hydraulic actuator deviates considerably from the target pressure profile, which is output by an electronic control unit. The resultant delays generate an unforeseen behavior for the superimposed activation and also affect the actuating accuracy and the comfort achievable therewith. In addition, the hydraulic oil, which is used not only for actuating but also cooling the components, foams up slightly at high volumetric flow rates or high rotating speeds at the components. The air dissolved in the foamed oil escapes in stabilizing phases such that air collects in the actuating system in this manner as well.

This air must be additionally compressed during the actuation of a hydraulic actuator, for example, in order to displace the piston of a clutch, which is expressed as an additional volume to be filled. If this additional volume is not sufficiently taken into account in the activation, the clutch is not located at the clutch engagement point after the fast fill phase and, for this reason, a relatively large volume must continue to flow into the actuating path and into the piston chamber in order to generate desired pressure changes and, therefore, torque responses, as the result of which the hydraulic system behaves sluggishly. The additional volume is theoretically sufficiently compensated for by an appropriate extension of the fast fill time, as described in the following with reference to FIGS. 1-4. As the operation continues, the air escapes via provided vent holes. An accurate, appropriate selection of the extension time is possible, however, only with a sufficiently accurate knowledge of the ratio of air in the particular preconditioned state (for example, standstill time, shutoff temperature, shutoff angle, etc.). This cannot be accurately determined in an easy way, however, but rather is merely estimated, which results in an insufficient accounting.

In order to sufficiently compensate for the effect of the air pockets on the hydraulic actuator and, for example, to be able to implement the desired increase in the power transmission capacity of the shift element in combination with good shifting comfort, relatively expensive sensors (pressure sensor, displacement sensor, or the like) are arranged in actuating systems and shift elements in order to be able to observe the actuation behavior and respond thereto. A method of this type, in which a clutch pressure is measured and the fast filling is configured accordingly, is known from DE 10 2009 055 063 A1.

In systems without a sensor, the effect of the air is estimated, for example, on the basis of the standstill time or a foaming simulation, and appropriately taken into account in the activation. This estimation is relatively inaccurate, however, since the leakage paths, via which the actuating ducts drain, are very different for production-related reasons and depend on the operating condition as well as on the non-influenceable and non-ascertainable shutoff state of the rotatable and actuatable parts.

Other strategies are based on venting pulses or waiting time for venting. These measures do not vent reliably, require a relatively long time, or put the system in an undefined initial state (for example, a partially filled clutch). A method of this type is known, for example, from DE 10 2013 224 744 A1.

SUMMARY OF THE INVENTION

A method is described herein in which a hydraulic actuator is filled and pressurized, with consideration for air pockets in the actuating system, such that the deviation between a target pressure profile and an actual pressure profile in the actuator is as low as possible without additional outlay for sensor systems.

Accordingly, a method is described for operating a hydraulic actuator of a drive device of a vehicle, wherein the drive device includes at least one hydraulic actuator, a pressure-adjusting device, and an electronic control unit activating the pressure-adjusting device. In order to actuate the actuator by an actuating system, the actuator is to be filled with a liquid operating medium and acted upon by a hydraulic pressure, wherein the pressure build-up in the actuator initially includes a fast fill phase and, thereafter, a pressure build-up phase. According to the invention, under certain operating conditions, the temporal length of the fast fill phase and the level of a fast fill pressure are adjusted as a function of an operating variable detected outside the hydraulic actuator and/or the actuating system, which is affected by the filling state and, thereby, the pressure conditions in the hydraulic actuator. This operating variable is, therefore, not an actuator operating variable in the hydraulic actuator or in its actuating system itself.

Therefore, an adjustment of the temporal length of the fast fill phase is advantageously possible without the need to detect an actuator operating variable by a sensor, the profile of which would require such a change of the length of the fast fill phase. The operating variables detected outside the hydraulic actuator and the actuating system are already detected and evaluated in an electronic control unit anyway in order to operate the drive device or the vehicle. As a result, the outlay of a specific sensor in the actuator or in the actuating system is saved, which allows for a simpler design, fewer parts, a simpler configuration of the drive device, and lower costs as well as a lower susceptibility to failure.

The actuator operating variable acting in the hydraulic actuator is therefore measured neither directly nor indirectly in the actuating system or in the hydraulic actuator.

It is possible that the actuator operating variable is a hydraulic pressure or a temperature or a distance by which components of the actuator are moved.

Preferably, it is possible that the actuator is a friction-locking shift element.

It is possible that the friction-locking shift element is a multi-disk clutch or a multi-disk brake.

In one further preferred embodiment, the friction-locking shift element couples an internal combustion engine to a drive train of the motor vehicle.

Alternatively, it is preferably possible that the actuator is a friction-locking shift element within the drive device.

The drive device is an automatic transmission, in particular a multi-ratio automatic transmission of a planetary design, or a dual-clutch transmission, or as a continuously variable automatic transmission, or as an axle drive, or as a wheel drive.

The operating variable outside the hydraulic actuator is detectable within the drive device or outside the drive device and at any point of the vehicle.

It is also possible that the actuator is a hydraulic accumulator.

In addition, the actuator is a hydraulic cylinder with a piston.

In particular, the actuator is a device for actuating shifting rails.

It is preferably possible that the vehicle includes at least one prime mover and the operating variable is an operating variable of the at least one prime mover.

The prime mover is an internal combustion engine or an electric motor or a hybrid drive in which an internal combustion engine and an electric machine are arranged in combination.

Preferably, it is possible that the operating variable is a torque of at least one prime mover on the basis of the temporal profile of which the pressure conditions in the friction-locking shift element are inferred.

Alternatively, or additionally, it is possible that the operating variable is a rotational speed of at least one prime mover of a vehicle on the basis of the temporal profile of which the pressure conditions in the friction-locking shift element are inferred.

In the case of an embodiment of the prime mover as an electric motor, it is possible that the operating variable is its current consumption profile over time, on the basis of which the pressure conditions and, thereby, the filling state in the friction-locking shift element are inferred.

It is also possible that the operating variable outside the actuator is an acceleration of the vehicle.

It is preferably possible that the fast fill pressure over time is changed depending on the profile of the signal of the operating variable over time.

Alternatively, it is possible that the fast fill pressure over time is changed depending on the gradient of the profile of the signal of the operating variable over time.

In one further embodiment, it is possible that the fast fill pressure is temporally varied depending on the temporal profile of the signal of the operating variable as well as on its gradient over time.

Preferably, the described method is carried out only for the case in which the drive device is in an operating condition in which air accumulations are to be expected in the actuator or in the actuating system.

Preferably, the method is carried out when the vehicle or the drive device was shut off before a certain minimum time and/or when an oil temperature of the drive device is under a certain value.

It is possible that a drive device for a vehicle includes at least one hydraulic actuator, which is operated by the above-described method.

In this context, it is possible that the hydraulic actuator or its actuating system does not have a sensor for detecting any type of actuator operating variable.

It is possible that a vehicle includes a hydraulic actuator and at least one prime mover, wherein the hydraulic actuator is operated by the above-described method.

The hydraulic actuator is arranged in the drive device or outside the drive device at any point of the vehicle.

BRIEF DESCRIPTION OF THE DRAWINGS

Exemplary embodiments of a method according to the prior art as well as of methods according to the invention are described in greater detail in the following, wherein:

FIGS. 1-4 show example pressure profiles over time of exemplary embodiments according to the prior art, FIG. 5 shows example pressure profiles over time of a first exemplary embodiment of a method according to the invention, FIG. 6 shows a schematic of a hybrid drive train suitable for use with the disclosed method.

DETAILED DESCRIPTION

Figure 1:
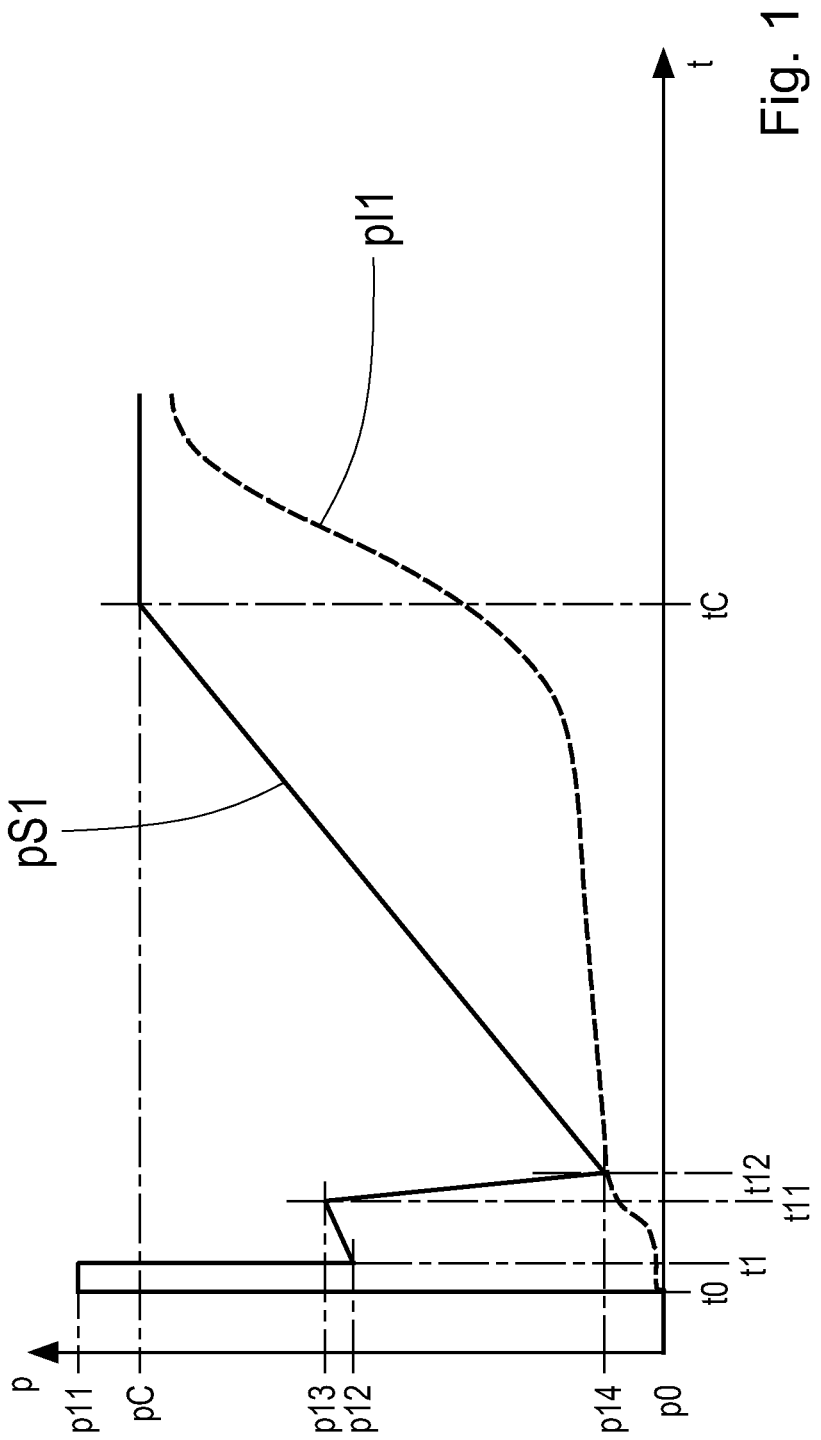

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a diagram in which the profiles of a pressure p over time t in response to a method for operating an automatic transmission according to the prior art are illustrated. The pressure p is the pressure in a friction-locking shift element, where the pressure p is to be raised or increased upon actuation of the shift element by a hydraulic control unit until the shift element halves of the friction-locking shift element are pressed against each other with a sufficient force such that the shift element halves are coupled to each other in a rotationally fixed manner and the shift element transmits a torque without slip at a point in time tC at the latest. FIG. 1 shows the profiles of a target pressure pS1 and of an actual pressure pI1 generated therefrom, which actually sets in in the shift element. An actual pressure is also referred to as a pressure sequence.

The target pressure pS1 is an idealized profile, which corresponds, for example, to an electric current, which is output by an electronic control unit to a valve device, such as, for example, an electronic pressure actuator. Therefore, the pressure in the shift element and also its temporal profile are adjustable by this electric current. An electronic pressure actuator is an actuator that converts an electric current into a hydraulic pressure. The part of the hydraulic system that encompasses the valve device up to the shift element is also referred to as an actuating system or actuating path. The drive device or the vehicle includes such electronic pressure actuators.

Against this background, the represented target pressure profile pS1 is to be understood such that the target pressure profile pS1 is actually an electric current that activates an electronic pressure actuator and adjusts a hydraulic pressure according to an ideally proportional relationship. The steep, pressure peak-like increase of the target pressure profile pS1 at a point in time t0 to a pressure value p11 is not to be understood such that the actual pressure profile pI1 should increase to this value, but rather that the pressure value p11 corresponds to an excessive current value, by which the electronic pressure actuator is transferred out of the rest condition into the operating condition.

If a friction-locking shift element is to be transferred from a disengaged state, in which only a drag torque is transmittable between the shift element halves, into an engaged state, then, after the described activation of the electronic pressure actuator at the point in time t0, the target pressure pS1 is controlled to a pressure value p12 at a point in time t1, and so the volume of the friction-locking shift element, which is still pressureless, is filled as quickly as possible with the operating medium, usually hydraulic or transmission oil. This is the beginning of a so-called fast fill phase. After the point in time t1, the pressure in the shift element is raised to a pressure value p13 in a flat increase up to a point in time t11 such that the shift element halves are preloaded against one another counter to elastic forces, wherein the contact force upon the shift element halves is still too low, however, to enable a torque transmission that could be utilized for a vehicle operation. After a complete filling and preload have been achieved, the fast filling is ended by reducing the pressure in a very steep manner to a pressure value p14, which is reached at a point in time t12. At this point, a ramp-like pressure build-up now begins, which is concluded once a pressure value pC is reached at a point in time tC, where the shift element is now completely engaged and the torque is transmittable from the input side to the output side without slip. The period of time from t0 to t12 is also referred to as the fast fill time or the fast fill phase.

The target pressure pS1 is configured for an ideal filling of the actuating system. The deviation between the target pressure profile pS1 and the actual pressure profile pI1 shown in the diagram in FIG. 1 sets in, for example, when the hydraulic system of the automatic transmission had been shut off and air had entered the hydraulic system due to an at least partial draining. This problem was not taken into account in the definition of the target pressure profile pS1, because this was based on a bleed actuating system. In the case of a restart after the operationally warm shutoff of the automatic transmission, it would be necessary to fill not only the elasticities or the air gap of the shift element, but also the air volumes that arose in the actuating system, by a fast fill. The deviation between the target pressure profile and the actual pressure profile is also referred to as a drag error and is that much more pronounced, the greater the amount of air it was that entered the hydraulic system. In the extreme case, this occurs possibly from very low temperatures below the freezing point, for example, upon the shutoff of a transmission at the maximum operating temperature, followed by cooling down overnight.

FIG. 1 shows a considerable deviation of the actual pressure pI1 from the target pressure profile pS1. The actual pressure profile pI1 slowly increases at the point in time t1 and reaches the pressure value p14 at the point in time t12 such that the actual pressure profile pI1 and the target pressure profile pS1 nearly coincide at this point. As the temporal profile continues, however, the flow filling the shift element according to the target pressure profile pS1 does not suffice for sufficiently quickly filling the volumes that have arisen due to the air pockets, and so the actual pressure profile pI1 rises only slowly and in a flat manner and, only after the point in time tC, increases to the pressure level predefined by the pressure value pC as the target value. According to the target pressure profile pS1, this should be achieved at the point in time tC. Due to this drag error, the pressure build-up in the shift element is prolonged in an impermissible and undesired way, which disadvantageously affects the spontaneity and the achieved accuracy of the actuation.

Figure 2:
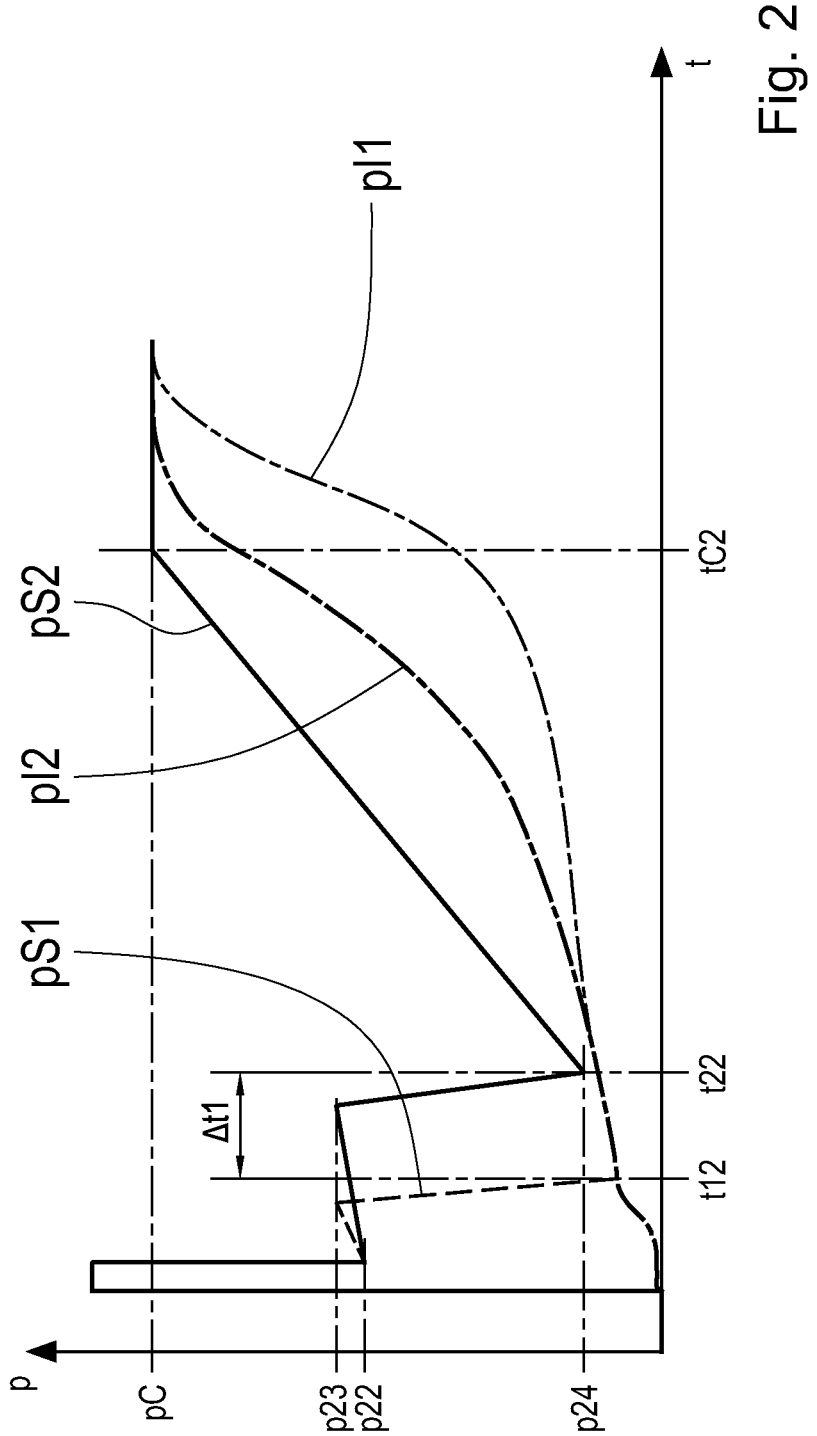

The additional volume that has arisen due to the air pockets is theoretically compensated for by an appropriate extension of the fast fill time. The diagram in FIG. 2 shows an extension of the fast fill time of this type. The end of the fast fill time has been shifted, with a modified target pressure profile pS2, from the point in time t12 by an extension time Δt1 to a point in time t22. The effect is reflected in a boost of an actual pressure profile pI2 that increases considerably faster than the actual pressure profile pI1, which is also represented in the diagram in FIG. 2, and, thereby, also reaches the pressure value pC sooner. According to the target pressure profile pS2, the pressure value pC should be set at a point in time tC2. Therefore, the air in the actuating system has been at least proportionally taken into account.

Figure 3:
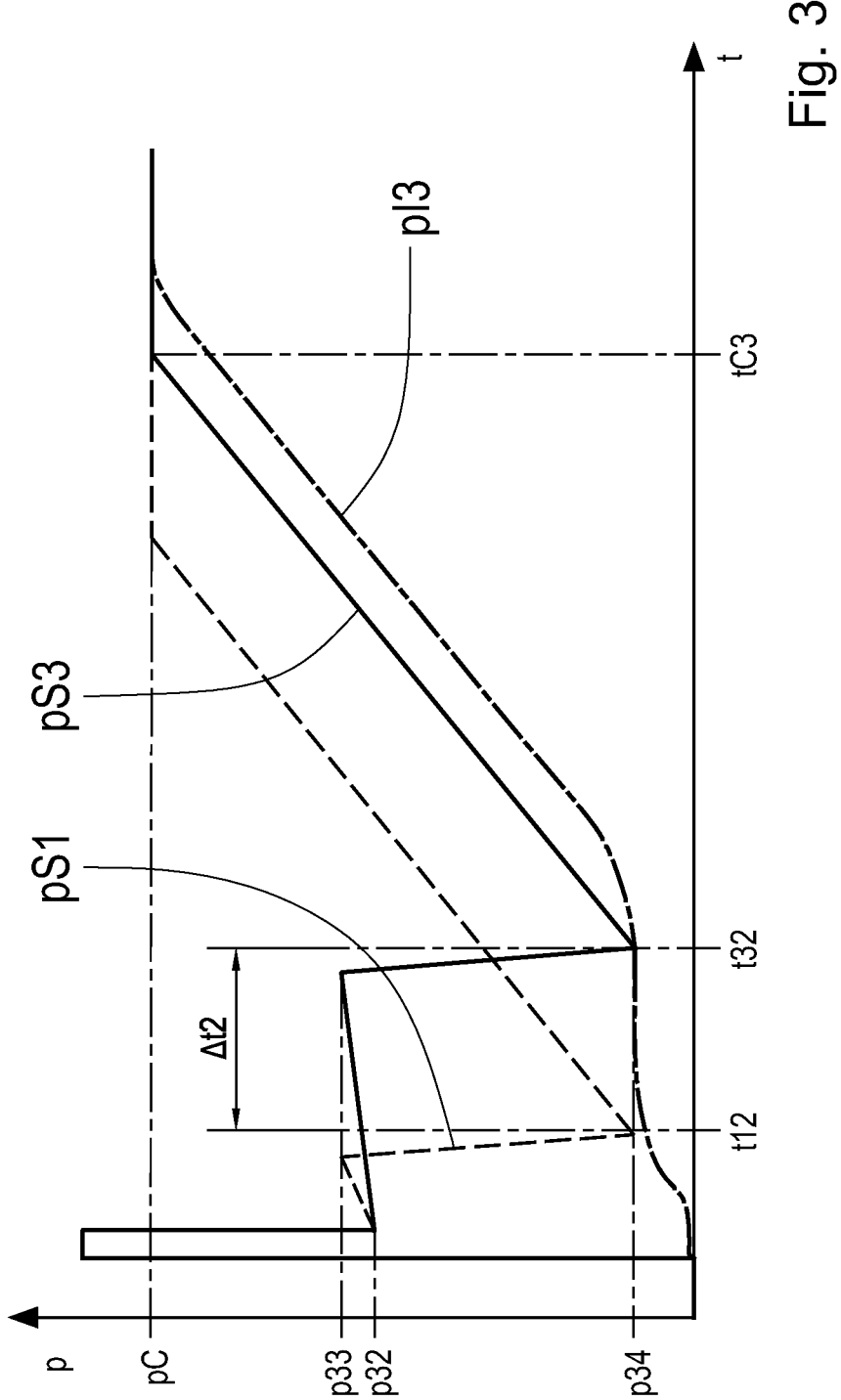

The diagram in FIG. 3 shows a further extension of the fast fill time, by an extension time Δt2, as compared to the initial value t12 of a bleed actuating system. The extension of the fast fill time from initial time t12 up to a point in time t32 brings about a further boost of the actual pressure profile to an actual pressure profile pI3, which now increases, with a relatively low drag error as compared to a target pressure profile pS3, with the same slope in parallel thereto at the point in time t32 and reaches the pressure value pC slightly later than at a sought point in time tC3 due only to the principle-related, permissible hydraulic delay time. Therefore, the air in the actuating system has taken into account in a precisely suitable manner.

If the extension time and, thereby, the fast fill time is selected to be too long and a fast fill pressure p43 is reduced too late, as shown with reference to the example in FIG. 4, an actual pressure profile pI4 results, which is just as undesirable as a selection of the extension time in FIGS. 1 and 2 that is too short. Since the fast fill pressure, which moves between the pressure values p42 and p43, is applied for a very long time, according to a target pressure profile pS4, due to a very long extension time Δt3 from t12 up to a point in time t42, the shift element is completely filled such that, at a point in time t42, the actual pressure profile pI4 steeply increases in the form of an overshot to a pressure value p45. This increase is halted at the point in time t42, since the fast fill pressure is just now reduced from the pressure value p43 to a pressure value p44 and, thereby, the fast fill phase is terminated. The actual pressure profile pI4 therefore reaches a local maximum at the point in time t42 and is far above the desired pressure value p44. Due to this excess pressure, the power transmission capacity of the form-locking shift element also increases such that a torque shock occurs, which is to be avoided in the interest of component load and actuation comfort. After the point in time t42, the actual pressure profile pI4 swings around the target pressure profile pS4 and reaches the pressure value pC almost simultaneously therewith. Therefore, the air in the actuating system has been taken into account by too great an extent, which, in the extreme case, results in strong, undesired responses, which are to be avoided in any case.

The consequences of not achieving the appropriate extension time become apparent from the representations of the actual pressure profiles at different fast fill times or extension times. In practical applications, the setting of an appropriate extension time is highly problematic, since the amount of air in the actuating system is not known. Due to the serious disadvantages of an actual pressure profile pI4 in combination with an extension time that is too long, the tendency in practical applications is to select an extension time that is too short, as in FIG. 2. Although this results in a drag error, there is no need to worry about the serious disadvantages of an actual pressure profile pI4 with the excess pressure and the subsequent oscillations in FIG. 4. Overall, however, any selection of an extension time without knowledge of the air volumes in the actuating system yields an unsatisfactory result. The extension times Δt1, Δt2, and Δt3 were established under certain assumptions, which are based on test results or calculations, wherein, due to the different influencing variables, such as the standstill time of the automatic transmission, temperatures, component tolerances, shutoff state of moving parts, and volumes of the actuating system, it tends to be a coincidence whether an appropriate extension time such as the extension time Δt2 is achieved. For the sake of surety, an extension time that tends to be too short, such as Δt1, is always selected and a drag error is accepted.

As mentioned at the outset, this disadvantage is to be eliminated by arranging a pressure sensor in the actuating system and in the shift element. As a result, it is possible to observe the pressure build-up in the shift element and, thereby, select the extension time that is appropriate to the situation. The disadvantage, however, is the high costs and a high outlay of parts associated with additional pressure sensors.

The diagram in FIG. 5 shows the pressure profiles of a method according to the invention, which gets by without additional pressure sensors. Here, the effect of the actuating system is observed in the form of the response of other operating variables in the automatic transmission or of the vehicle, and the extension time is adjusted accordingly by reducing the fast fill pressure only once a criterion of the response has been established. Thus, in the method according to FIG. 5, a target pressure profile pS5 initially increases, as in the case of a completely filled actuating system, from a pressure value p52 to a maximum fast fill pressure value p53, which is reached at a point in time t11 and is held constant as the temporal profile increases up to a point in time t51. An actual pressure profile pI5 gradually increases at the point in time t11 and also remains nearly constant in the phase of the constant target pressure profile pS5 while the piston chamber of the shift element is filled. An increase takes place similarly to the increase of the piston restoring force, for example, from a return spring. Shortly before the point in time t51, the actuating system has been filled to such an extent that the actual pressure profile pI5 increases. At the point in time t51, the actual pressure profile pI5 exceeds a certain pressure value and the actual pressure profile pI5 changes its gradient.

Figure 7A:
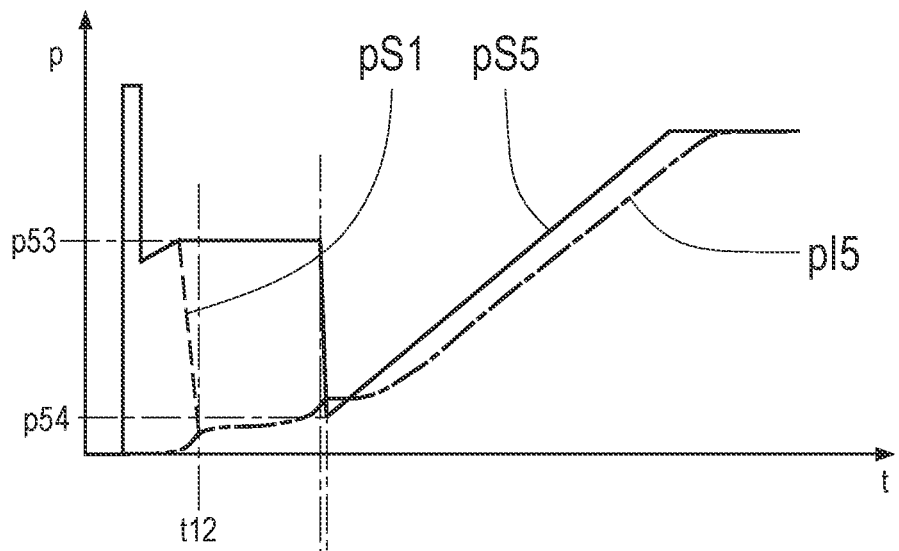
FIGS. 7a-c show example time-dependency diagrams of different operating variables of the method according to the invention according to FIG. 5.
Figure 7B:
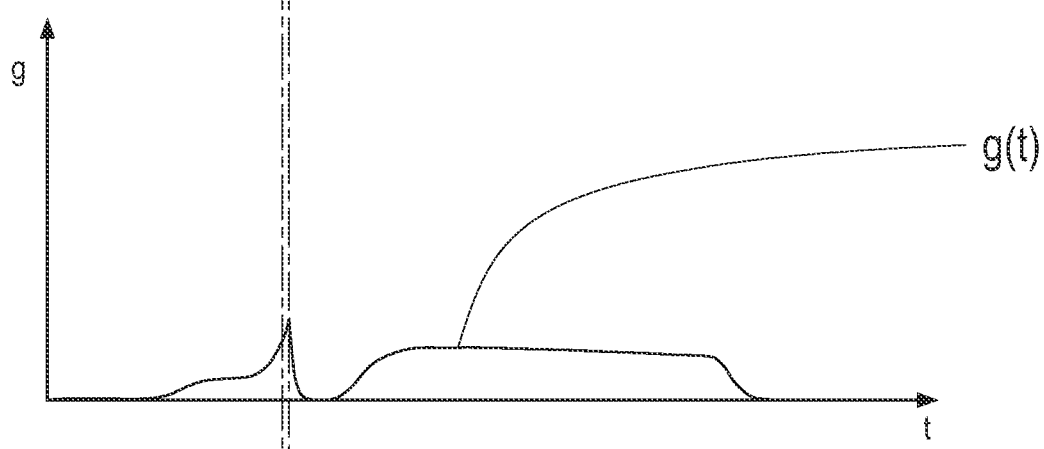
Figure 7C:
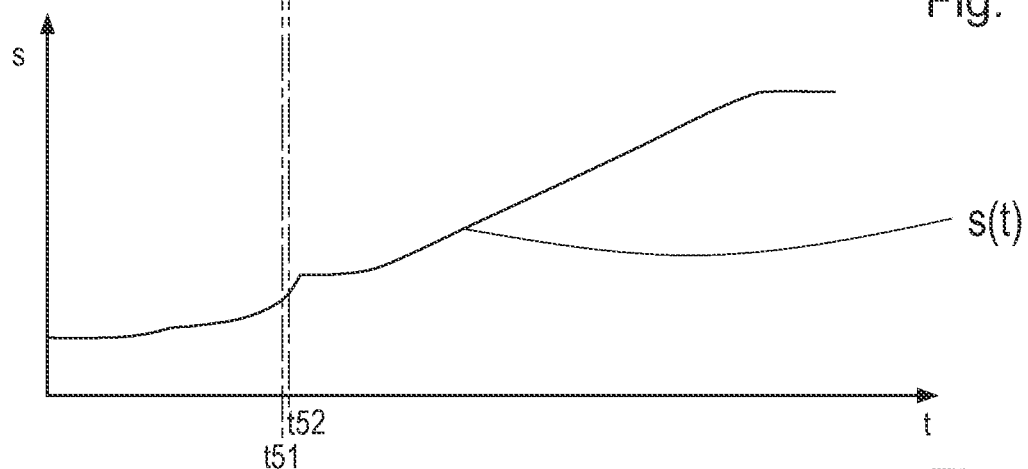

If a pressure sensor were now arranged in the actuating system, this pressure increase could act as a criterion at the point in time t51 for triggering an abrupt reduction of the fast fill pressure or of the target pressure profile pS5, wherein, however, an essential problem addressed by the invention is that of avoiding the outlay of a pressure sensor. Without a pressure sensor in the actuating system and, therefore, without a measurement of the actual pressure pI5, its increase cannot be noticed. Since the increase of the actual pressure profile pI5 affects other operating variables outside the hydraulic actuator in the drive device or of the vehicle, however, which are already detected in an electronic control unit in order to fulfill the functions of the drive device, this is utilized according to the invention to infer the actual pressure profile pI5, as shown in FIGS. 7a-c.

On the basis of the criterion that is to tag an end of the fast fill phase, the target value of the fast fill pressure is abruptly reduced, at the point in time t51, from the pressure value p53 to a pressure value p54, which is reached at a point in time t52. This now yields an extension time Δt4 from t12 to t52 for the fast fill phase as compared to the point in time t11. Due to the pressure drop, the actual pressure profile pI5 does not continue to increase, but rather dwells at the pressure value p55 for a certain length of time and follows, with a slight time delay, the target pressure profile pS5 in the ramped increasing pressure build-up phase. The pressure value pC, as the target value, is likewise reached by the actual pressure profile pI5 having a drag error with a slight time delay as compared to a desired point in time tC5 and with the same slope as the target pressure profile pS5.

Regardless of the air volumes present in the actuating system, the correct extension time is now always set and the air volume is now always appropriately taken into account due to the control of the fast fill pressure on the basis of the criterion.

If the expected response does not take place by the end of the regular fast fill time, the filling activation is maintained until an expected response is observed. The filling activation is suitably concluded at the point in time at which the expected response is observed. Here, "suitably" means that the operating sequence is either abruptly terminated or a conclusion or transition process is carried out, or a further time is activated as an overrun.

This example is based on an automatic transmission that is a dual-clutch transmission having a hybrid design. The diagrammatic configuration thereof is represented in FIG. 6. An internal combustion engine VKM is coupleable to an electric motor EM by a clutch K0. A dual clutch DK is rotationally fixed to the electric motor EM as a drive device, wherein the dual clutch DK includes two clutches K1 and K2, which are selectively engageable during the driving operation. The diagrammatic dual-clutch transmission is merely one example of the application of the method, which is usable in the same manner in any other type of transmission that includes hydraulic actuators to be filled with an operating medium for the actuation thereof.

The prime mover is an internal combustion engine or an electric motor or a hybrid drive including an internal combustion engine and an electric machine.

If, in the case of the dual-clutch transmission in FIG. 6, when an internal combustion engine VKM is stopped and the clutches K0, K1, and K2 are disengaged or slipping, the electric motor EM is now driven and the clutch K0 is filled and pressurized in the fast fill phase for the actuation thereof, a slight torque builds up, which, in order to maintain the current rotational speed, becomes evident in the current consumption of the electric motor. The current consumption of the electric motor EM is a measure of its actual torque.

In the present system, therefore, use is made of the fact that the electric motor EM must counteract the internal combustion engine VKM drag torque (when the internal combustion engine VKM is not running) coupled in via the clutch K0 in order to maintain the rotational speed, for example, when the vehicle is at a standstill with an active idling speed controller. In situations in which the clutch K0 is to be actuated based on the driving strategy (for example, starting the internal combustion engine VKM at a standstill), an observation of the response is made on the basis of suitable signals (for example, torques or rotational speeds in the drive train. Here, the signal value as well as the change of the signal value (gradient) are observed and evaluated.

The current consumption is detected in the electronic control unit as a signal s for the torque, which is represented over time in the diagram in FIG. 7c as a signal curve s(t) over time t. The diagram in FIG. 7b shows an associated gradient profile g(t), i.e., the derivative of the signal profile s(t) over time t. FIG. 7a shows, in a diagram, the actual pressure profile pI5 from FIG. 5 as the operating variable.

Further operating variables, the signal or the derivative of which are usable as a criterion, are all signals, in principle, that permit an inference of the actual torque applied at the shift element. These operating variables are, for example, a torque balance at the electric motor EM, the rotational speed profile of the electric motor EM, the rotational speed profile of the internal combustion engine VKM, the torque of the internal combustion engine VKM, and signals from a torque sensor, a system pressure sensor, a flow rate sensor, an acceleration sensor, or a position sensor.

At the point in time t51, a response to the increase of the actual pressure profile pI5 in FIG. 7a is evident in the signal profile s(t) as well as in the gradient profile g(t), which means an increase of torque in the electric motor EM. The level of the gradient value g as well as of the signal value s as well as both variables act as a criterion here, upon the achievement of which the fast fill pressure is reduced by reducing the target pressure profile pS5 at the point in time t51 from the pressure value p53 to the pressure value p54, which is to be reached at the point in time t52. In this way, the gradient profile g(t) provides information about the dynamics, for example, of a change in torque at a driving machine. The signal value s(t) itself is also meaningful when this is, itself, already a measure of the actuation.

Figure 8:
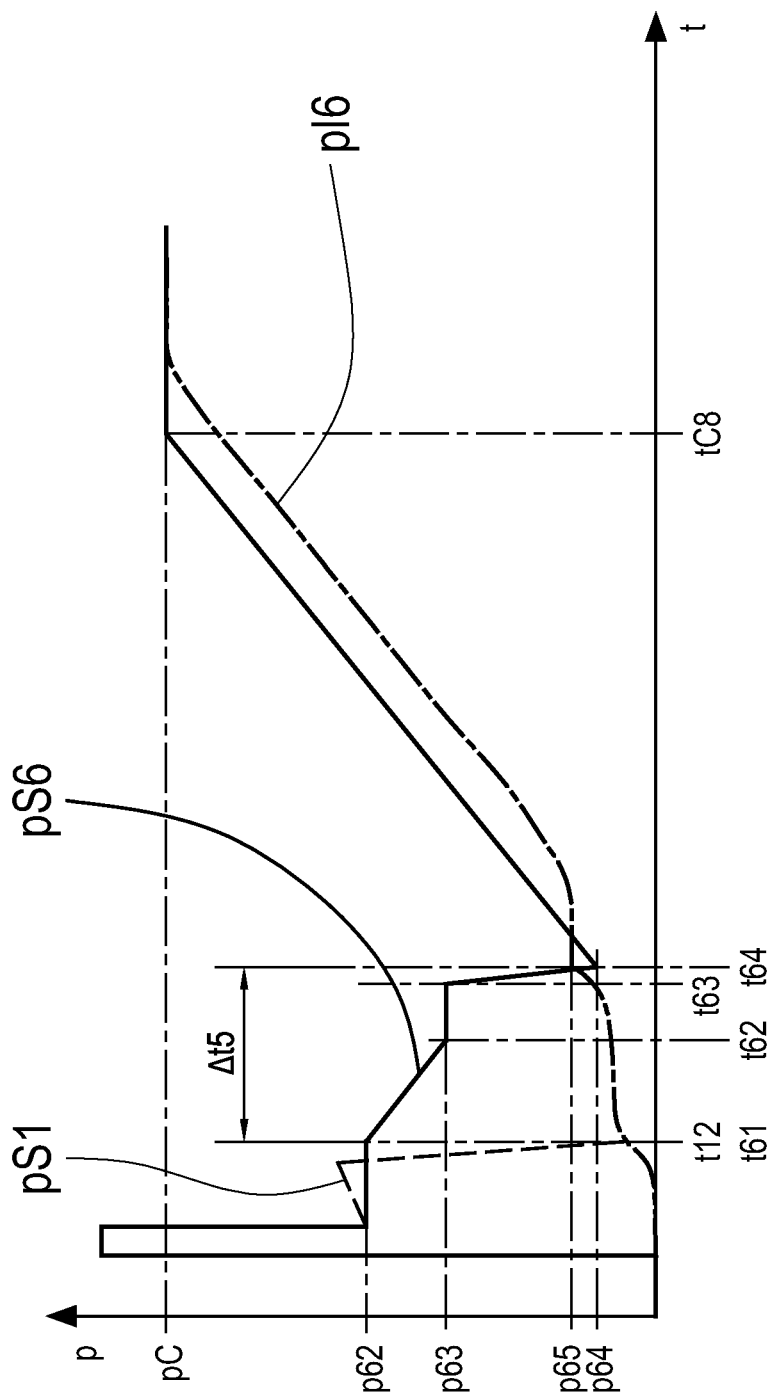
FIG. 8 shows example pressure profiles over time of one further exemplary embodiment according to the invention.

FIG. 8 shows an optimized embodiment of the method with an observation of a response outside the actuating system. Here, in a target pressure profile pS6, a pressure value p62 is output as the fast fill pressure after the first pressure peak and is held constant up to a point in time t61, which corresponds to the point in time t12 of the target pressure profile pS1. This takes place in order not to activate the final fast fill pressure level too quickly at the beginning of the filling while the actuating system has not yet responded. As a result, the flow rate, which largely results due to the actuated pressure differential between a pressure value p62 or p63 and ambient pressure p0, without the expected back pressure initially for filling a system acted upon by air, is not higher than desired, which could otherwise result in an excessively steep pressure build-up with pressure values that are too high.

At the point in time t61, an extension time Δt5 is appended as compared to the target pressure profile pS1, within which the fast fill pressure is reduced from the pressure value p62 to a pressure value p63, which is reached at a point in time t62, in order to more slowly fill the shift element at the end of the fast fill phase such that the response is less pronounced up to the conclusion of the activation. It is useful, however, to maintain a minimum level. At the point in time t62, the fast fill pressure is held constant at the pressure value p63 until the response of the operating variable, which acts as a criterion, takes place at a point in time t63, whereupon the fast fill pressure in the target pressure profile pS6 is abruptly reduced to a pressure value p64, which is to be reached at a point in time t64. The actual pressure profile pI6, which increased toward the end of the fast fill phase, i.e., before the point in time t64, since the volume to be filled was full, now remains constant, due to the decrease of the target pressure profile pS6, at a pressure value p65, which deviates only slightly from the desired pressure value p64 and follows the target pressure profile pS6 with a drag error in parallel with the same slope up to the pressure value pC at a point in time tC8 as the target value.

In the case of highly actuation-sensitive systems, in order not to always have to wait, in principle, for a response, which then results in disruptive responses, the observation is activated only when air is probably in the system and the shutoff is then carried out in a timely manner. This is the case, for example, after long standstill times, during intense cooling of the drive device during the standstill, or during operating conditions with heavy oil foaming.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

| Reference characters | |
|---|---|
| DK | dual clutch |
| EM | electric motor |
| g | gradient |
| g(t) | time profile of the gradient |
| K0 | clutch |
| K1 | first clutch of the dual clutch |
| K2 | second clutch of the dual clutch |
| p | pressure |
| p0 | pressure value |
| p11 | pressure value |
| p12 | pressure value |
| p13 | pressure value |
| p14 | pressure value |
| p22 | pressure value |
| p23 | pressure value |
| p24 | pressure value |
| p32 | pressure value |
| p33 | pressure value |
| p34 | pressure value |
| p42 | pressure value |
| p43 | pressure value |
| p44 | pressure value |
| p45 | pressure value |
| p52 | pressure value |
| p53 | pressure value |
| p54 | pressure value |
| p55 | pressure value |
| p62 | pressure value |
| p63 | pressure value |
| p64 | pressure value |
| p65 | pressure value |
| pC | pressure value |
| pI1 | actual pressure profile |
| pI2 | actual pressure profile |
| pI3 | actual pressure profile |
| pI4 | actual pressure profile |
| pI5 | actual pressure profile |
| pI6 | actual pressure profile |
| pS1 | target pressure profile |
| pS2 | target pressure profile |
| pS3 | target pressure profile |
| pS4 | target pressure profile |
| pS5 | target pressure profile |
| pS6 | target pressure profile |
| s | signal |
| s(t) | time profile of the signal |
| t | time |
| t0 | point in time |
| t1 | point in time |
| t11 | point in time |
| t12 | point in time |
| t22 | point in time |
| t32 | point in time |
| t41 | point in time |

| -continued | |
|---|---|
| Reference characters | |
| t42 | point in time |
| t51 | point in time |
| t52 | point in time |
| t61 | point in time |
| t62 | point in time |
| t63 | point in time |
| t64 | point in time |
| tC | point in time |
| tC2 | point in time |
| tC3 | point in time |
| tC4 | point in time |
| tC5 | point in time |
| tC8 | point in time |
| Δt1 | time difference |
| Δt2 | time difference |
| Δt3 | time difference |
| Δt4 | time difference |
| Δt5 | time difference |
| VKM | internal combustion engine |

The invention claimed is:

1. A method for operating a hydraulic actuator (K0) for a prime mover or a drive device of a vehicle, the method comprising:
   determining that the hydraulic actuator (K0) is to be actuated via an actuating system controllable to adjust a fill level of a liquid operating medium in the hydraulic actuator (K0), the actuating system having a pressure-adjusting device controllable by an electronic control unit, the hydraulic actuator comprising a friction-locking shift element (K0);
   detecting an operating variable (g, s) of at least one prime mover (EM, VKM) of the vehicle, the operating variable (g, s) being a torque or a rotational speed of the at least one prime mover (EM, VKM), the operating variable (g, s) being influenced by a filling state of the hydraulic actuator (K0) and indicative of pressure conditions in the hydraulic actuator (K0), the pressure conditions in the friction-locking shift element (K0) being inferred based on a temporal profile of the operating variable (g, s), the operating variable (g, s) being separate from an actuator operating variable (p) of the hydraulic actuator (K0) and an actuator operating variable (p) of the actuating system;
   pressurizing the hydraulic actuator (K0) during a fast fill phase to one or more pressures over a fast fill time period in response to determining that the hydraulic actuator (K0) is to be actuated, with the fast fill time period and the one or more pressures being adjusted as a function of the operating variable (g, s) under certain operating conditions; and
   pressurizing the hydraulic actuator (K0) during a pressure build-up phase after the fast fill phase.

2. The method of claim 1, wherein the actuator operating variable (p) of the hydraulic actuator (K0) is measured neither directly nor indirectly in the actuating system or in the hydraulic actuator (K0).

3. The method of claim 1, wherein the friction-locking shift element (K0) is a multi-disk clutch or a multi-disk brake.

4. The method of claim 3, wherein the friction-locking shift element (K0) couples an internal combustion engine (VKM) to a drive train of the vehicle.

5. The method of claim 1, wherein the friction-locking shift element (K1, K2) is within a drive device (DK).

6. The method of claim 1, wherein the at least one prime mover comprises an electric motor (EM), the operating variable (s) being the torque of the electric motor (EM), the torque of the electric motor (EM) being represented by a current consumption profile over time (t) of the electric motor (EM), the pressure conditions in the friction-locking shift element (K0) and the filling state in the friction-locking shift element (K0) being inferred based on the current consumption profile over time (t) of the electric motor (EM).

7. The method of claim 1, wherein a fast fill pressure (p) during the fast fill phase is changed depending on a profile (s(t)) of the operating variable (s) over time (t).

8. The method of claim 1, wherein a fast fill pressure (p) is changed depending on a gradient (g(t)) of a profile of the operating variable (s) over time (t).

9. The method of claim 1, wherein a fast fill pressure (p) is changed depending on a temporal profile of the operating variable as well as a gradient (g(t)) of the temporal profile over time (t).

10. The method of claim 1, wherein the certain operating conditions comprises when a transmission of the vehicle is in an operating state in which air accumulations are expected.

11. The method of claim 10, wherein air accumulations are expected when one or both of the vehicle transmission was shut off before a certain minimum time and an oil temperature of the vehicle transmission is below a certain value.

12. A drive device (DK) for a vehicle, the drive device (DK) comprising the hydraulic actuator (K0) operated by the method of claim 1.

13. The drive device of claim 12, wherein one or both of the hydraulic actuator (K0) and the actuating system does not have a sensor for detecting the actuator operating variable (p).

14. The drive device of claim 13, wherein the drive device is one of a multi-ratio automatic planetary transmission, a dual-clutch transmission (DK), a continuously variable automatic transmission, an axle drive, or a wheel drive.

15. A vehicle, comprising the hydraulic actuator (K0) operated by the method of claim 1 and at least one prime mover (EM, VKM).

16. The vehicle of claim 15, including a drive device having the hydraulic actuator (K0) operated by the method of claim 1, wherein the drive device is an automatic transmission, a dual-clutch transmission, an axle drive, or a wheel drive.

17. The vehicle of claim 15, wherein one or both of the hydraulic actuator (K0) and the actuating system does not have a sensor for detecting the actuator operating variable (p).

18. A method for operating a hydraulic actuator (K0) for a prime mover or a drive device of a vehicle, the method comprising:

determining that the hydraulic actuator (K0) is to be actuated via an actuating system controllable to adjust a fill level of a liquid operating medium in the hydraulic actuator (K0), the actuating system having a pressure-adjusting device controllable by an electronic control unit;

detecting an operating variable (g, s) when a transmission of the vehicle is in an operating state in which air accumulations are expected, the operating variable (g, s) being influenced by a filling state of the hydraulic actuator (K0) indicative of pressure conditions in the hydraulic actuator (K0), the operating variable (g, s) being separate from an actuator operating variable (p) of the hydraulic actuator (K0) and an actuator operating variable (p) of the actuating system;

pressurizing the hydraulic actuator (K0) during a fast fill phase to one or more pressures over a fast fill time period in response to determining that the hydraulic actuator (K0) is to be actuated, with the fast fill time period and the one or more pressures being adjusted as a function of the operating variable (g, s) under certain operating conditions; and pressurizing the hydraulic actuator (K0) during a pressure build-up phase after the fast fill phase.

19. The method of claim 18, wherein the hydraulic actuator comprises a friction-locking shift element (K0), and wherein the vehicle includes at least one prime mover (EM, VKM), the operating variable (s) being an operating variable of the at least one prime mover (EM, VKM).

20. The method of claim 19, wherein the operating variable (s) is a rotational speed of the at least one prime mover (EM, VKM), the pressure conditions in the friction-locking shift element (K0) being inferred based on a temporal profile of the rotational speed of the at least one prime mover (EM, VKM).

21. The method of claim 19, wherein the at least one prime mover comprises an electric motor (EM), the operating variable (s) being a current consumption profile over time (t) of the electric motor (EM), the pressure conditions in the friction-locking shift element (K0) and the filling state in the friction-locking shift element (K0) being inferred based on the current consumption profile over time (t) of the electric motor (EM).

22. The method of claim 18, wherein the hydraulic actuator (K0) comprises a hydraulic accumulator.

23. The method of claim 18, wherein the hydraulic actuator (K0) comprises a hydraulic cylinder with a piston.

24. The method of claim 18, wherein the hydraulic actuator (K0) comprises a device for actuating shifting rails.

* * * * *